(12) United States Patent
Fuerst et al.

(10) Patent No.: US 7,809,751 B2
(45) Date of Patent: Oct. 5, 2010

(54) AUTHORIZATION CONTROLLED SEARCHING

(75) Inventors: Karl Fuerst, Wiesloch (DE); Juergen Hofmann, Gorxheimertal (DE); Ionut Istrate, Worms (DE); Thomas Finke, Hockenheim (DE); Florian Kresser, Lobbach (DE); Marieta Koch, Heidelberg (DE)

(73) Assignee: SAP AG, Walldorf (DE)

( * ) Notice: Subject to any disclaimer, the term of this patent is extended or adjusted under 35 U.S.C. 154(b) by 352 days.

(21) Appl. No.: 11/845,631

(22) Filed: Aug. 27, 2007

(65) Prior Publication Data

US 2009/0063490 A1    Mar. 5, 2009

(51) Int. Cl.
*G06F 17/30* (2006.01)

(52) U.S. Cl. .............. 707/783; 707/999.001; 707/999.009; 707/999.107; 713/166; 713/190

(58) Field of Classification Search .......... 707/1, 707/3, 9, 10, 100, 104.1, 999.001, 999.009, 707/999.01, 999.107; 713/166, 190
See application file for complete search history.

(56) References Cited

U.S. PATENT DOCUMENTS

| | | | |
|---|---|---|---|
| 6,366,915 B1 * | 4/2002 | Rubert et al. ............. | 707/10 |
| 6,487,552 B1 * | 11/2002 | Lei et al. .............. | 707/999.004 |
| 6,581,054 B1 * | 6/2003 | Bogrett .................. | 707/4 |
| 6,581,060 B1 | 6/2003 | Choy | |
| 7,051,039 B1 | 5/2006 | Murthy et al. | |
| 7,140,044 B2 * | 11/2006 | Redlich et al. ............. | 726/27 |
| 7,240,046 B2 * | 7/2007 | Cotner et al. ......... | 707/999.003 |
| 7,346,617 B2 * | 3/2008 | Wong ................. | 707/999.009 |
| 7,350,226 B2 * | 3/2008 | Moriconi et al. ............ | 726/1 |
| 7,593,942 B2 * | 9/2009 | Sack et al. ................. | 707/9 |
| 2003/0187848 A1 * | 10/2003 | Ghukasyan et al. .......... | 707/9 |
| 2007/0038596 A1 * | 2/2007 | Pizzo et al. ................. | 707/2 |

FOREIGN PATENT DOCUMENTS

WO    WO 03/030032 A    4/2003

* cited by examiner

*Primary Examiner*—Tim T. Vo
*Assistant Examiner*—Dangelino N Gortayo
(74) *Attorney, Agent, or Firm*—Mintz, Levin, Cohn, Ferris, Glovsky and Popeo, P.C.

(57) ABSTRACT

Methods and apparatus, including computer program products, for authorization controlled searching. In general, a search request is received, a database data structure is searched where the data structure is populated with records that include data and criteria for authorization to access the data, and a set of results is presented to a user, where the set of results includes data from the data structure for which a user is authorized the criteria is used to determine which results to include in the set of results. The criteria for authorization to access the data may be simple or complex, and may be based on a formation of associations from multiple layers of associations.

20 Claims, 8 Drawing Sheets

202
        INDEX                                  206
     | MATNR | ... | BEGRU | ... | MTART    | USER |
204→ | 1     |     | 1     |     | RAW      | X    |
206→ | 2     |     | 1     |     | FINISHED | A    |
208→ | 3     |     | 2     |     | FINISHED | B    |
210→ | 4     |     | 2     |     | FINISHED | B    |
     | 5     |     | 2     |     | RAW      | B    |
     | 6     |     | 3     |     | RAW      | B    |
     | 7     |     | 3     |     | RAW      | B    |
218→ | 8     |     | 3     |     | FINISHED | B    |

FIG. 2

AUTHORIZATION CONTROLLED SEARCHING

BACKGROUND

The present disclosure relates to data processing by digital computer, and more particularly to authorization controlled searching.

Search engines may search large amounts of data in database data structures, such as database tables or indexes, to find results. The data in either data structure may be structured data that represents business objects. Unstructured data like documents and files may also be part of the business objects. For example, for a set of indexes, each index may represent a node in a data model of a business object and each record in an index may represent an instance of a node of a business object. In that example, a collection of indexes may represent a business object and a collection of records from indexes may represent an instance of a business object. Thus, a collection of records may be searched to search business object data.

SUMMARY

The subject matter disclosed herein provides methods and apparatus, including computer program products, that implement techniques related to authorization controlled searching.

In one general aspect, a search request is received; a database data structure is searched where the database data structure is populated with records based on data from database data structures where the records include data and criteria for authorization to access the data; and a set of results is presented to a user. The searching includes generating a set of results including data from the database data structure for which a user is authorized and omitting data from the database data structure for which the user is not authorized, where the generating includes using the criteria to determine which results to include in the set of results.

In a related aspect, a search request is received, a database data structure is searched where the data structure is populated with records that include data and criteria for authorization to access the data, and a set of results is presented to a user. The searching includes generating a set of results including data from the data structure for which a user is authorized, where the generating includes using the criteria to determine which results to include in the set of results.

In a related aspect, a database data structure is populated with records based on data from database data structures where the records include data and criteria for authorization to access the data. The populating includes populating a column of the criteria to be used to determine whether a user is authorized to access a record based solely on the criteria and environment information, where the populating the column includes accessing two or more layers of associations in a database data structure to find the criteria to be used to determine whether the user is authorized to access the record.

In a related aspect, a database data structure is populated with records based on data from database data structures, where the records include data and criteria for authorization to access the data. The populating includes populating a column of the criteria to be used to determine whether a user is authorized to access a record based solely on the criteria and environment information, where the environment information includes user information and the populating the column includes accessing two or more layers of associations in database data structures of business object node instances and the database data structures include authorization information to find the criteria to be used to determine whether the user has access to the record. A search request is received, and the database data structure is searched, where searching the database data structure includes generating a set of results including data from the database data structure for which a user is authorized and omitting data from the database data structure for which the user is not authorized, and the generating includes using the criteria to determine which results to include in the set of results. The set of results is presented to the user.

The subject matter may be implemented as, for example, computer program products (e.g., as source code or compiled code tangibly embodied in computer-readable media), computer-implemented methods, and systems.

Variations may include one or more of the following features.

Data in the records may be structured data, unstructured data, or a combination of the two. Structured data may include business objects and unstructured data may be nodes of a business object. Records may represent instances of nodes of business objects.

A database data structure may be generated from a join of two or more of database data structures to include data and criteria for authorization to the data in the records, where the two ore more of the database data structures may have the data and the criteria in separate data structures. A database data structure may be generated from database data structures where the criteria is specific to an attribute of one of the database data structures. A database data structure may be generated from database data structures where the criteria is specific to an attribute of a node of a business object instance.

Criteria may include names of users, roles, profiles, or groups.

Search results may be filtered based on user information and criteria from a database data structure during a search as an intrinsic part of the search or filtered after the search. Generating a set of results may include modifying a query of a search request to include user information corresponding to the criteria. For example, a name of a user requesting a search may be added to a modified query. Generating a set of results may include filtering the set of results based on user information and criteria from a database data structure.

A database data structure may be populated with records, where the populating includes populating a column of criteria to be used to determine whether a user is authorized to access a record based solely on the criteria and environment information, where the environment information includes user information. Populating the column may include accessing two or more layers of associations in database data structures of business object node instances and database data structures including authorization information to find the criteria to be used to determine whether the user has access to the record.

User information may include a name of a user.

A search of a database data structure of unstructured data may be performed in response to a search request and results of the search of the table of unstructured data may be added to a set of results in addition to results from a search of structured data.

A set of results may be stored in memory, such as a volatile memory or persistent storage device.

Presenting may include displaying set of results to a user.

Database data structures may include database tables, indexes, or a combination of database tables and indexes. Indexes may be stored in volatile memory.

The subject matter described herein can be implemented to realize one or more of the following advantages. Layers of associations of authorization criteria may be reduced to a single association and, potentially, included with a record to simplify determining whether a user is authorized to access a record. Load on a backend system during search execution may be avoided as a backend need not be checked to determine whether a user is authorized to access data. Similarly, there may be no dependency on availability of the backend system during search execution. Scalability may be easier on a central search server as each record may include authorization criteria for determining authorization such that tables or indexes that normally include authorization information need not become locked resources. A proper number of search results may always be returned as authorizations may be considered while generating a set of results (e.g., a number of search results need not include information for which a user is not authorized to access). Similarly, a correct "guided navigation" is possible (results may be refined; e.g. a search for customers named "IBM" may be performed, which returns twenty hits, then, guided navigation may indicate that by selecting a country "US" there would be fifteen hits or by selecting "DE" there would be five hits). Performance may be improved as there need not be a call to backend system during search execution to determine authorization which may avoid network and processor time spent calling such a backend system. Performing a search may be optimized on many types of data sources as authorization criteria may be associated with the data (e.g., mass search on central index or multiple federated searches). Only valid links may be provided as part of search results (e.g., instead of providing links which might lead to a resource to which access is denied to a user by a backend). In contrast to access control lists, in which data may be indexed with an access control list, where an access control list may directly connect a user with a business object instance, access control list indices may get very large, and updates of single aspects of authorization may lead to a need to change an access control list index, updates of authorization data structures (e.g., indexes) may be made local (e.g. an assignment of a user to a profile need not effect an index of an authorization check object).

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 2 is a block diagram of an index of structured data that includes authorization information.

Like reference numbers and designations in the various drawings indicate like elements.

DETAILED DESCRIPTION

Figure 1:
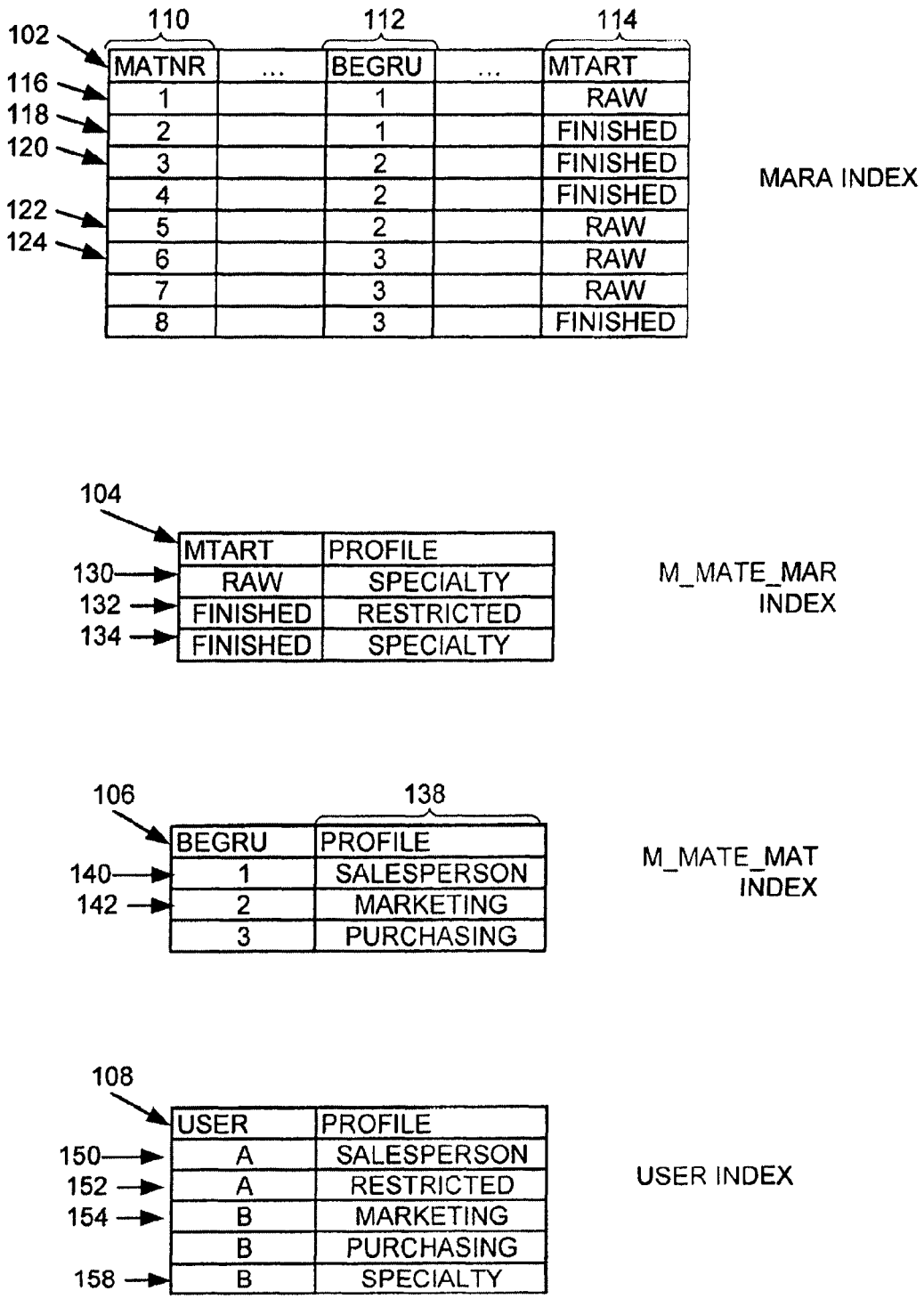
FIG. 1 is a block diagram including multiple indexes of structured data.

In general, in FIGS. 1-8, data may be structured or unstructured business data (such as documents). Structured data may be structured in the sense that data may be attributes or key figures which are organized in a data structure, such as a table, and attributes or key figures may have dependencies. For example, in a table of information, a row may have dependencies among data in the row such that data in each of the columns of the row is associated with other data in other columns of the row. Structured data may represent business objects, which may include a set of nodes having relationships among nodes that reflect a hierarchy of information. Unstructured data may be part of a business object. Some business objects may have relationships to other business objects. In general, business object models may be represented by entity-relationship models. Basic entities in such models may be the business objects that consist of nodes, which carry attributes. Relationships among nodes may be modeled as foreign key relations. Each business object may have exactly one root node, which holds a key of the business object that may be used to identify an instance of a business object. Nodes of a business object may be arranged as a tree (with nodes being parents or children depending on a relationship to another node). Any combination of structured and unstructured information may be stored in a table. For example, an unstructured part of information may be stored in an attribute containing binary information. For example, in a table of information, a row may contain attributes such as "created by", "created on", "last changed by", "last changed on", "size" being structured data and an attribute "content" may contain the document itself in binary format being unstructured data. Additionally to this information any kind of processed information may be attached to this record. This may include words which where extracted from the document.

Authorization checks may be part of a business object model. For example, an authorization check may be modeled to take effect on a node of a purchase order business object by being attached to this node. To enforce the authorization check, systems that utilize the instance of the business object may check to see if an authorization check exists, and if it is found, perform an authorization check based on information contained in the node. For example, the authorization check may have a name of a user group allowed to access the instance of the purchase order business object and an application may know to only allow access to the instance if a user requesting access is in the user group. Any number of types of authorization checks may be combined with a variety of operators to a resulting authorization check (e.g. "Check 1 AND Check 2 OR Check 3" may define a combination of three checks with Boolean operators defining a relationship among the checks that is to be satisfied to grant access).

Different types of access may be granted depending on authorization information. For example, different users or groups of users may be authorized for different sets of one or more activities where the activities may, as examples, include generating data (e.g., generating a new attribute to add to a business object node), changing data, displaying data, and flagging data for deletion.

The data used to determine whether a user is authorized to access data may be referred to authorization information or authorization criteria, which may be used with user data to determine authorization. Authorization information or criteria may include an identification of one or more users; an identification of one or more roles; an identification of one or more groups of users (where a group may be used to identify users); an identification of one or more profiles of users; an access control list (which may include a list of names that may be granted access); logic (e.g., a transformation of an index or a "virtual index" to execute logic during search execution (and behaves like an index); organizational structure (e.g., dependencies between organizational units or lookup tables may be evaluated); time dependency information (e.g., data which are relevant for authorization may be time dependent, and consideration of time dependency information may include determining validity of a snapshot and re-indexing accordingly, or considering time in a search index); and the like.

As an example, authorization checks may be done by executing complex programming logic. The logic and the data that affect an outcome of the authorization check may have to be analyzed and interpreted in such a way that the data is transformed to a format that may be used by a search engine during run-time. For example, a complex authorization logic that considers hierarchical and time dependent organizational units to determine authorization may be transformed to an index containing an interpretation of authorization information in view of the hierarchical and time dependent organizational units, and an update logic that reads organizational unit data each hour to fill the indexes with updated time-dependent information.

Throughout the description the term material is used to refer to physical substances and does not necessarily imply the use of the term material in other senses.

Also, throughout the description the term user is used to refer to user who consumes data of a data structure, services of a search engine, or both although the term user may refer to other types of users, such as an administrative user that designs tables. Similarly, a domain of users may differ. For example, a user may be a user of an application from which searching is available, or an operating system or operating environment in which the application runs. For example, an application may have a domain of user accounts that is used to determine whether a user is authorized to access a record or user accounts of an operating environment may be used to determine an identity of a user.

Also, throughout the description, database data structures to store records may be database tables, physical indexes, or logical indexes. Any combination of data structures may be used to store records.

FIG. 1 is a block diagram including multiple indexes of structured data. In general, the indexes may be used to determine whether a user is authorized to access a record. The indexes include a first index 102 named "MARA INDEX," a second index 104 named "M_MATE_MAR INDEX," a third index 106 named "M_MATE_MAT INDEX," and a fourth index 108 named "USER INDEX."

The names of the indexes may reflect data stored in the indexes and may be in accordance with naming conventions for an enterprise resource planning system. For example, the first index 102 may be a index of materials business object data having material master records, the second index 104 may include material type authorization for material master records where authorization information is used to determine whether a user is authorized to view a material master record for a specific material type, the third index 106 may include material type authorization for material master records where authorization information is used to determine whether a role is part of a group authorized to view a specific material master record, and the fourth index 108 may include associations of users and attributes of users that may be used to determine whether a user is authorized to perform activities related to a record of the first index 102.

In the first index 102, each record represents a node of a material business object and columns are key attributes that represent attributes of a node. In the first index 102, the first column 110 "MATNR" includes attributes that represent a material number of a materials business object, the second column 112 "BEGRU" includes attributes that represent a group of authorized users of a particular record, and the third column 116 "MTART" includes attributes that represent a material type. As an example of a record, a first record 116, which is in a first row of the index 102, has a material number '1', is accessible to an authorization group '1', has a material type of "raw," and that record represents an instance of a business object node.

A rule associated with the first index 102 may define that two checks must be satisfied to grant access to records, where the two checks include checking whether a user is of an authorization group of the node and the user has access to a material type of the node. To determine this information, the second and third indexes 104, 106 may be used in combination with the fourth index 108. In particular, the second index 104 may be used in combination with the fourth index 108 to determine whether an authorization group of the record matches an authorization group of the user, and similarly, the third index 106 may be used in combination with the fourth index 108 to determine whether a material type of the record matches a material type associated with the user.

For example, if a user A requests access to the first record 116, a first check may check whether the user A is associated with the authorization group 1 of the first record 116, which may involve checking the third index 106 to determine which profiles in a column 138 of profiles matches authorization group 1, where a first record 140 of the third index includes an association to salesperson, such that the authorization group 1 is determined to be associated with the salesperson profile. The first check may further involve determining whether the user A is associated with a profile from the third index 108 with a lookup in the fourth index 108. Following the example, a first record 150 of the fourth index 108 includes an association between the user A and the salesperson profile such that the first check would result in a positive indication that user A has satisfied the first check. Following the example, the second check may check whether user A is associated with a material type of the first record 116 of the first index. As the first record 116 has the material type raw, a check of profiles associated with the raw material type is performed with the second index 104, where the specialty profile matches the raw material type in a first record 130 of the second index 104. Based on the profile of the second index, a further determination is made as to whether the user A matches that profile by performing a lookup in the fourth index 108. As the profile specialty is not associated with the user A in the fourth index 108, the second check would not be satisfied. Thus, user A would not be granted access to the first record 116 as one of the two checks has failed and the rule requires both checks to be satisfied.

As another example, if the user A were to request access to a second record 118 of the first index 102, the first check is satisfied as the authorization group 1 is associated with the user A through a combination of associations in the first row 140 of the third index 106 and the first row 150 of the fourth index 108. The second check is also satisfied as the material type finished of the second record 118 is associated with the user A through a combination of associations in a second record 132 of the second index 104 between finished and restricted, and a second record 152 of the fourth index 108 between user A and restricted. As both the first and second checks are satisfied, user A is granted access to the second record 118 of the first index 102.

Similarly, if a user B requested access to a third record 120, a fifth record 122, or a sixth record 124 of the first index 102, the user B is granted access based on combinations of associations in the indexes. For example, for the third record 120, user B satisfies the first check as the third record 120 has an authorization group 2 that is associated with user B through a second record 142 of the third index 106 (association between authorization group 2 and marketing) and a third record 154 of the fourth index 108 (association between user B and marketing); and user B satisfies the second check as the third record 120 has a material type finished that is associated with user B through a third record 134 of the second index 104 (association between finished and specialty) and a fifth record 158 of the fourth index 108 (association between user B and specialty).

Similarly, for the fifth record 122 the first and second checks are satisfied, respectively through chains of associations of the authorization group 2 with user B (the second record 142 of the third index 106 has an association between authorization group 2 and marketing, and the third record 154 of the fourth index 108 has an association between user B and marketing) and material type raw with user B (the first record 130 of the second index 104 has an association between raw and specialty, and the fifth record 158 of the fourth index 108 has an association between user B and specialty).

Thus, to check whether a user is authorized to access a record in the first index 102, a combination of authorization checks must use a combination of indexes to form associations. The use of a combination of indexes may be viewed as a combination of layers of associations of authorization information, which may be a result of a configuration of indexes such that, for example, user names are two or more associations away from a node to which an authorization check is to be applied. For example, the combination of two associations for a first check associated with authorization groups of nodes represented by the first index 102 may be a result of an information management system already including the data in the first index 102 as having attributes and separate authorization indexes, such as the second and third indexes 104, 106, which relate attribute values to profiles such that the authorization check may be performed based on attribute values; and having a separation between users and profiles to allow for flexible assigning of profiles to users, where profiles may be associated with a user in the fourth index 108. Advantages of having multiple layers of associations may be to reduce a size of an index and processing resources for updating the index, as an index of records with associated users may take up a total number of records being a number of users times a number of instances of a business object node, which may be much larger than having separate indexes for authorization information and updating such a large index. In contrast to having such a large index, performing a join, for example, for each search may use less memory (as only those indexes being searched may be joined) and updates many individual instances need not be performed (as only those indexes associated with an authorization check may be updated, which may be far fewer entries).

Although FIG. 1 includes a certain combination of indexes and data in the indexes, implementations may vary. For example, something other than materials information may be described in the indexes. As other examples, a rule for determining access need not rely on checking multiple attributes, may check more than two attributes, may include a combination of logic (e.g., a combination of Boolean logic to determine which attribute values must be satisfied), may rely on key figures instead of attributes (e.g., if a key figure is greater than one thousand), and the like. As another example, some or all of the indexes of FIG. 1 may be tables instead of indexes.

FIG. 2 is a block diagram of an index 202 of structured data that includes authorization information. In general, the index 202 includes records that may be nodes of business object instances and includes authorization information associated with each record. For example, a first record 204 may be an instance of a node of a business object that includes that authorization information of a user name in a column 206 of user names. The authorization information may be used to determine whether a user is authorized to access a record. For example, if a user A requests access to a second record 206, the user A may be granted access based on the existence of the user A in the column 206 of user names that may indicate the user A is associated with the record and allowed access.

The index 202 may be a result of a join operation of database data structures. The index 202 may exist for a search engine (e.g., be calculated and stored for use in response to search requests) or be calculated on-the-fly during search execution (e.g., as a logical index generated in response to a search request).

The index 202 of FIG. 2 may be generated by crawling a series of database data structures, such as the indexes of FIG. 1. For example, if the rule described above with reference to FIG. 1 is implemented for the indexes of FIG. 1, the indexes may be crawled to determine which users are allowed access to each record in the first index 102 of FIG. 1, and the index 202 of FIG. 2 may be generated with a selection of columns from the first index 102 and the column 206 of user names including those users allowed to access particular records.

As another example, the index 202 may be generated during a search based on join operations of the indexes of FIG. 1. Joins between tables or indexes may be implemented by matching attribute values. When indexes for one and a same table are joined, matching row identifiers may be used to match attribute values. When indexes from different tables are joined, there are generally no matching row identifiers and instead joins may be defined by matching specified values. In the case of a join based on matching attribute values, there may be multiple rows with the same value in either or both of the indexes to be joined. In this case, depending on the purpose of joining the rows, the join operation either may or may not aggregate rows with matching values.

For example, the index 202 may be a result of joining the first, second, third and fourth indexes 102, 104, 106, and 108. In particular, the fourth index 108 may be joined with the second index 104 to generate a first join index (e.g., including the materials associated with users) and the first join index may be joined with the first index 102 to generate a second join index (e.g., having records with the materials associated with user names). The fourth index 108 may be joined with the third index 106 to generate a third join index (e.g., having authorization groups associated with user names), and the third join index may be joined with the first index 102 to generate a fourth join index (e.g., having the records with the authorization groups associated with user names). Then, the second join index and the fourth join index may be joined to generate the index 202 where a user name is only included in a record if the user name is associated with both the material and authorization group of a record.

Including the authorization information in the index 202 may provide various advantages including not having to perform authorization checks across multiple database data structures each time a record is accessed; not having to access a backend or remote system if authorization information for determining access is located in a backend or remote system, respectively (which may reduce lag time, avoid network downtime, avoid system downtime, and the like); and simplifying authorization checks (e.g., as associations need not be formed based on multiple layers of associations during search execution).

The index 202 may be searched such that records responsive to a user request may be returned as search results where the search results only include those records for which a user is authorized to access. For example, if a user A requests a search of the index 202 with certain criteria of key figures and attributes, a search engine may ensure that only those records for which user A is authorized to access are returned in a result set.

There may be different ways in which a search engine only includes those records for which a user is authorized to access. For example, a search engine may modify a query sent by a user to include a user name attribute (or other criteria) as part of the query. For example, if a user B sends a request for all records having a material finished, a search engine may modify the query to include all records having a material finished and user B, such that only a third record 208, a fourth record 210, and an eighth record 218 are in a result set.

As another example, a search engine may perform a query and then filter an initial result set for those results matching a user. For example, if a user B requests a search matching a query for all records having a material finished, a result set may include the second record 206, the third record 208, the fourth record 210, and the eighth record 218. Then, the result set may be filtered based on the column 206 of user names such that only the third record 208, the fourth record 210, and the eighth record 218 are included in the result set.

As another example, where the index 202 does not exist, a search engine may modify a search to include information relating to associations to a user. For example, a query for a user B of all records having the material finished may be modified to include all records having the material finished (as user B is already associated with specialty which is associated with finished, no modifications may be required for the second check) and a user authorization group being 2 or 3 (which is added for the first check based on the associations of user B with marketing and purchasing).

Although FIG. 2 includes a certain combination of data in the index 202 and the index 202 is described as being used in a certain way to determine authorization to access the records of the index 202, implementations may vary. For example, although FIG. 2 includes a column 206 of user names to indicate authorization to access a record other types of information may be used. For example, the other information may be self-contained similar to the user names such that other records of other database data structures need not be checked to determine whether a user is allowed to access a record (e.g., in contrast to the checks described with reference to the indexes of FIG. 1). For example, a rule may indicate that a user A is only authorized to access a record during business hours of eight to five and that rule may be included in a row of a record, and the rule may check a users identification and system time to determine whether access is to be granted. As another example, although the index 202 only includes a single user per a record, multiple users may be authorized to access a record and that may be conveyed by, for example, having the column 206 of user names include lists of users.

Figure 3:
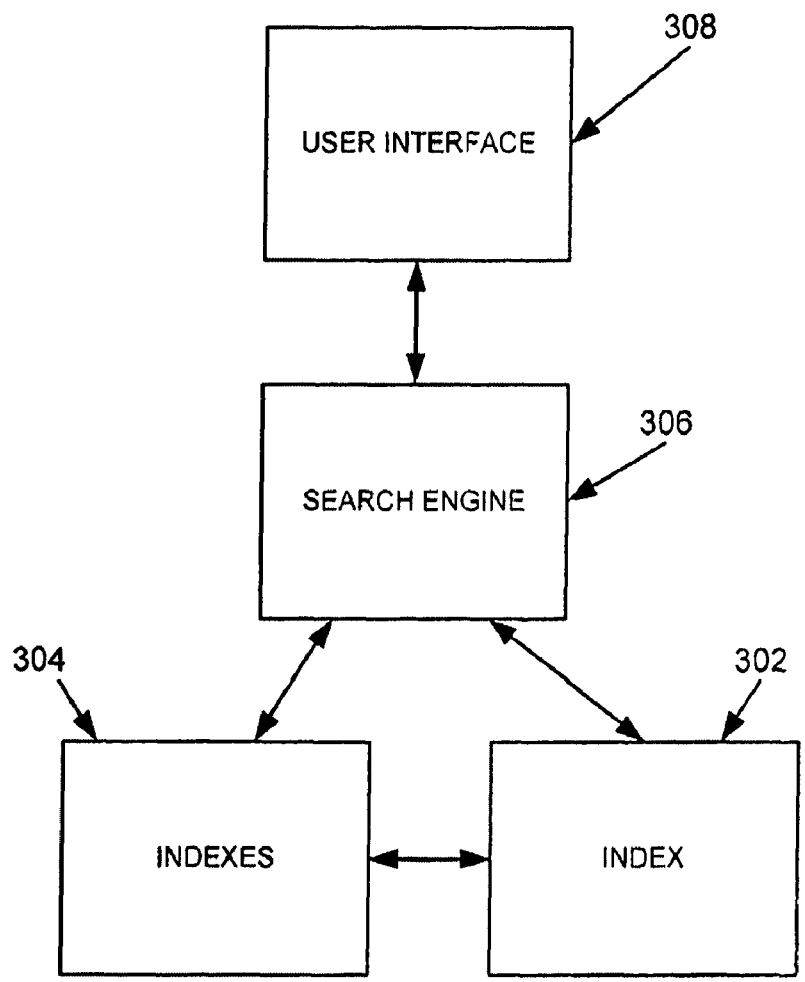
FIG. 3 is a block diagram of a system to generate an index from indexes and search the index.

FIG. 3 is a block diagram of a system 300 to generate an index 302 from indexes 304 and search the index 302. The system 300 may use components of FIGS. 1-2. For example, the indexes 304 may be the indexes 102, 104, 106, 108 of FIG. 1 and the index 302 may be the index 202 of FIG. 2. In general, the system includes a search engine 306, a user interface 308, the index 302, and the indexes 304.

The search engine 306 may handle requests to search information stored in the index 302 or the indexes 304 to find records that match search criteria. The search engine 306 may be referred to as a search engine because the search engine 306 is an engine that searches through data (such as the index 302, which may be held in memory) for inclusion in result sets to be returned to users.

The user interface 308 may provide access to the search engine 306 for a user. For example, the user interface 308 may be a graphical user interface or a command-line user interface that may be used to enter search requests that may be relayed by the user interface 308 to the search engine 306, and the user interface 308 may display search results provided by the search engine 306. For example, a user may select a combination of pull-down menus or type text in a text field such that a query "ALL PRODUCTS OF TYPE FINISHED ORDERED BY CUSTOMER ABC BETWEEN 2007 Jan. 1 AND 2007 May 5," is generated by the user interface 308 and sent to the search engine 306. Then, if the index 302 is an index of product orders, the search engine 306 may perform the search on the index 302 to find a set of results, which may be referred to as a result set, that matches the query. Searching the index may include finding rows that match attributes related to the date range of the request to generate a result set, then, the result set may be filtered for product orders having an attribute with the value matching "ABC COMPANY." Results in the result set may be limited to only those results for which a user has authorization to access. The results in the result set may then be returned by the search engine 306 and displayed by the user interface 308. The user interface 308 may support searches that are logically equivalent to queries in a standard language such as SQL (Standard Query Language), which may be supported by the search engine 306.

Limiting results in a result set to only those results for which a user has authorization to access may be performed by various techniques, such as modifying a query or filtering a result set, as described above with reference to the index 202 of FIG. 2.

In general, a result set from a search performed by the search engine 306 is a subset of rows or sub-rows selected from an index or table to satisfy a user request. For example, an index of product items may include rows for each product, one of the columns may be an attribute color that includes values that represent colors, such as red, blue, green, yellow, and the like, and other columns may include attributes for prices and sizes. Following that example, a user may request a list of red items with their prices and sizes. In response to the request the search engine 306 may read from the index rows including the attribute value red and generate a result set including those rows.

The index 302 is an index of a database index, which may be generated from structured data in relational indexes, which may be the indexes 304. The index 302 may be generated by crawling the indexes 304 or by joining the indexes 304.

In the index 302, each record may represent an instance of a node of a business object. Each record may include authorization information that may be used to determine whether a user is able to access the record. Some records might not be restricted from access in which case a convention may be applied when generating records that may be understood when searching records. For example, entries of a column of authorization information may be left blank to indicate that a record my be accessed by all users and the search engine 306 may understand when searching for records that records having a blank entry in a column of authorization information may be accessed by all users.

The index 302 may be a column index, an inverted index, a noninverted index, or combination of indexes. For example, the index 302 may be a combination of column indexes for each key attribute. In general, a column index is created from a column in a relational table as a list of row values for a column attribute or key figure. For example, if a column specifies a color of an item in each row of the table, the column attribute may be color and the attribute values for rows may be red, white or blue.

The indexes 304 are database indexes of structured data. Each index may be a selection of attributes, key figures, or both from a database table, where each table may represent a node of a business object and each record in a table may represent an instance of a node of a business object such that each record of the index also represents an instance of a node of a business object. A collection of records from different indexes or tables may represent an instance of a business object. Relationships between node instances may be represented by entries in records. For example, a foreign key may be in a record in a column indicating the foreign key refers to a parent node instance.

The indexes 304 may be generated as physical indexes of tables that are maintained (e.g., updated) and are not generated in response to a search request; whereas, the index 302 may be a result of a join operation performed in response to a search request. In some implementations the index 302 may be generated in response to other triggers such that, for example, an authorization check is not dependent on access to a backend system that may store the indexes 304.

In the indexes 304, access to business objects or nodes of business objects may be restricted. The access may be restricted according to rules that are implicit or explicit, which may be referred to as authorization rules. For example, the search engine 306 may understand that certain attributes are always associated with an authorization check (e.g., the authorization group attribute BEGRU of the first index 102 may always be associated with an index of authorization information, such as the third index 106, such that any index having an authorization group attribute is to be checked to see if a user requesting access is associated with an attribute value matching an authorization group attribute). As another example, a table or index may include a rule that defines a check or series of checks to be made to access data in the table or index, respectively. For example, the first index 102 may include a rule that indicates both BEGRU and MTART must be satisfied, and the search engine 306 may read the rule and ensure that access to the first index 102 is restricted according to that rule.

Authorization rules may apply to a specific instance of a business object node, to a data model of business objects nodes such that a rule applies to all instances of a node, or some combination of the two. Similarly, authorization rules may apply to all nodes of a business object, may be node-specific, or both. To indicate that an authorization rule applies to an entire business object, the authorization rule may be associated with a root node of a business object. For example, a root node may be associated with one rule that applies to access to any node of the business object and a particular node may have an additional rule to be applied when accessing the particular node such that both rules may need to be checked to authorize a user to access the particular node.

Similar to having authorization checks propagated from a business object to all nodes, authorization checks may be propagated from one business object to other business objects. For example, an authorization check of a first business object being a parent of a second business object may be propagated to the second business object such that access to the second business object is restricted based on the authorization check of the first business object.

Authorization information that relates to an instance of a node of a business object may be represented by tables or indexes that associate attributes or key figures of a node instance to information that may be used to determine whether a user has authorization. For example, authorization information for instances of nodes of business objects in the first index 102 of FIG. 1 is represented by the combination of the second, third, and fourth indexes 104, 106, 108. Authorization information may be included in a same table or index of instances of business object nodes. For example, the index 202 of FIG. 2 includes the authorization information in the column 206 of users.

In addition to handling search requests, the search engine 306 may generate the index 302 from the indexes 304. For example, the search engine 306 may generate the index 202 of FIG. 2 based on the indexes 102, 104, 106, 108 of FIG. 1. To generate the index 302 from the indexes 304, the search engine 306 may have implicit authorization rules for determining how to include authorization information in the index 302 or the search engine 306 may interpret explicit authorization rules to include authorization information in the index 302. The index 302 may be generated such that only the authorization information in the index 302 and environment information need be used to determine whether to authorize an access. Environment information may include, as examples, user identification (e.g., a name of a user who has requested a search), system time, and the like. In general, the authorization information 302 may allow for authorization to be determined, for records without having to, for example, access a backend system to determine whether a user is authorized to access information. The authorization information may be referred to as authorization criterion or criteria, as the information may be used as criterion or criteria to determine whether access is authorized.

Although the system 300 of FIG. 3 includes a certain number and type of components, implementations may vary. For example, the search engine 306 may search tables or indexes other than the index 302, and those tables or indexes need not be access restricted. For example, the search engine 306 may search unstructured data, in addition to or instead of structured data, and merge results from that unstructured data with results from the index 302. For example, unstructured data may be included with metadata serving as attributes of the unstructured data in a database data structure.

Figure 4:
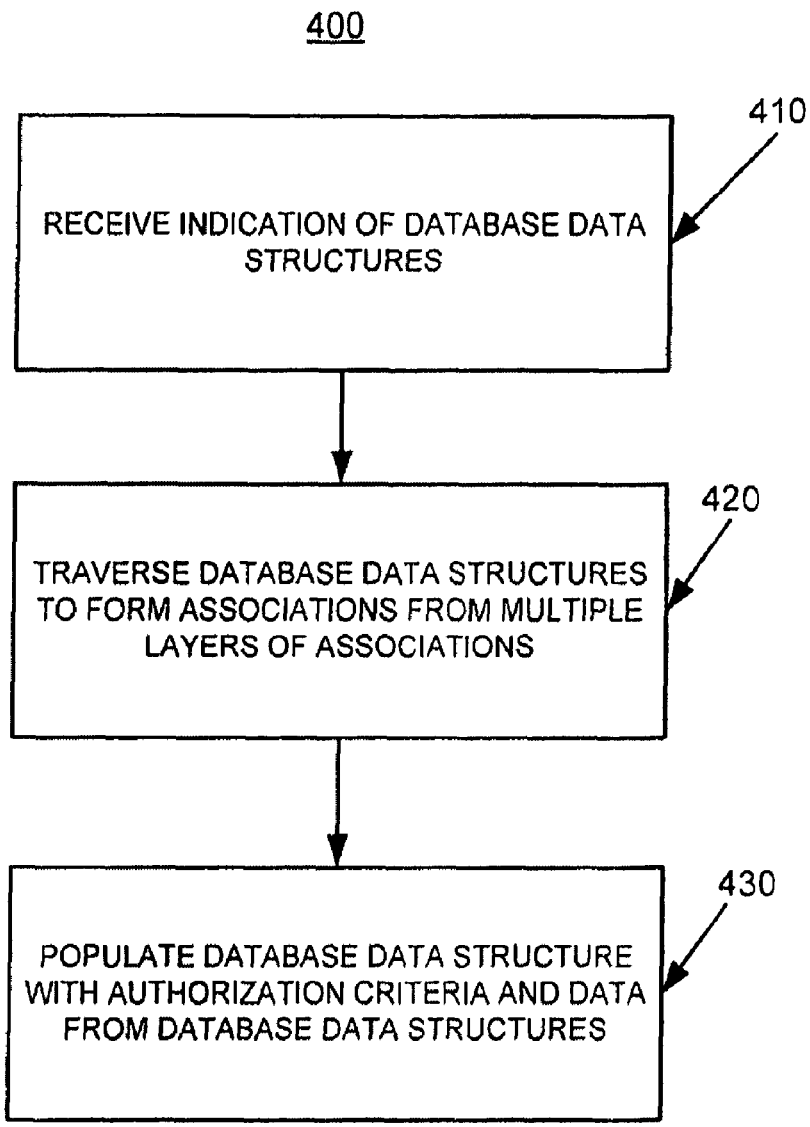
FIG. 4 is a flowchart illustrating a process of generating an index including authorization criteria.

FIG. 4 is a flowchart illustrating a process 400 of generating an index including authorization criteria. In general, the process 400 involves receiving an indication of database data structures (410), traversing database data structures to form associations from multiple layers of associations (420), and populating a database data structure with authorization criteria and data from database data structures (430). The process 400 may be performed in a system such as the system 300 of FIG. 3. For example, the search engine 306 may perform the operations of the process 400.

An indication of database data structures is received (410). The database data structures may be database tables, database indexes, or a combination of the two. In general, the database data structures may include records for which access is restricted based on authorization criteria that is not included in the database data structure of the records, and database data structures that include the authorization criteria or may be used to determine authorization criteria. For example, in FIG. 1, the first index 102 includes limited authorization criteria and the second, third, and fourth indexes 104, 106, 108 may be used, in combination, to determine authorization criteria that may be included in the index 202 of FIG. 2.

Database data structures are traversed to form associations from multiple layers of associations (420). The traversing and forming of associations may be part of a join operation to join database data structures. For example, the indexes 102, 104, 106, 108 of FIG. 1 may be joined to produce the index 202 of FIG. 2, which includes associations from multiple layers of associations. By forming associations from multiple layers of associations, authorization criteria may be reduced and simplified.

A database data structure is populated with authorization criteria and data from database data structures (430). For example, the index 202 may be populated with the user names in the column 206 of user names and other data based on the combination of indexes 102, 104, 106, 108 in FIG. 1. In some examples authorization criteria may be more complex. For example, authorization criteria may include a rule that depends on system environment information, such as a time of day.

Figure 5:
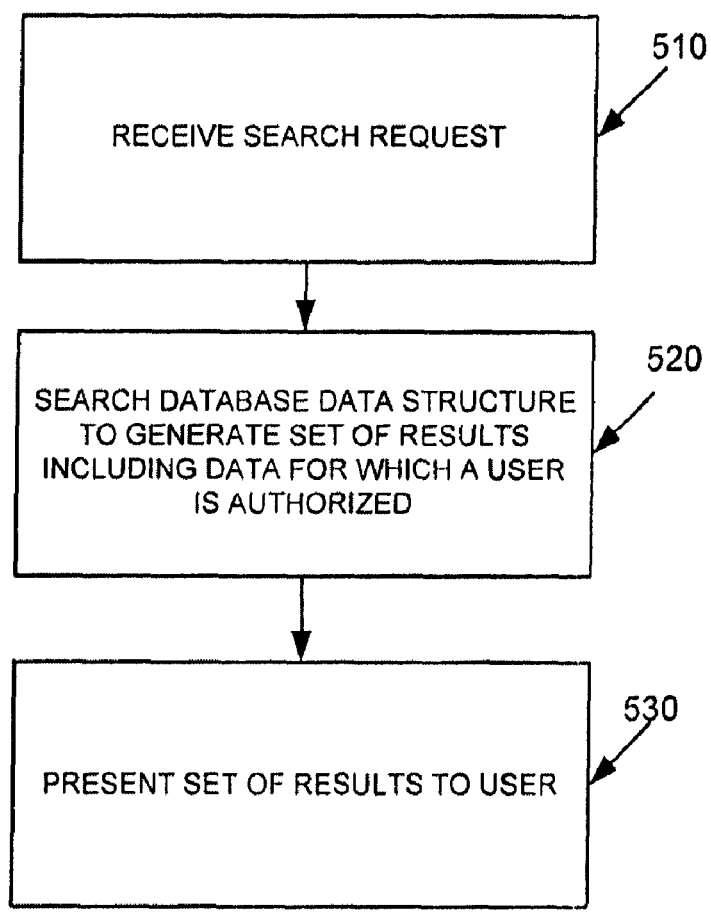
FIG. 5 is a flowchart illustrating a process of searching an index including authorization criteria.

FIG. 5 is a flowchart illustrating a process 500 of searching an index including authorization criteria. In general, in the process 500, a search request is received (510), a database data structure is searched to generate set of results including data for which a user is authorized (520), and a set of results are presented to a user (530). The process 500 may be performed in a system such as the system 300 of FIG. 3. For example, the search engine 306 may perform the operations of the process 500.

A search request is received (510). The search request may include search criteria and be a query for information that includes structured and unstructured data. For example, the search request may be a request to search a repository of structured business object data. As another example, the search request may include a repository of structured business object data and a repository of software support help articles.

A database data structure is searched to generate a set of results including data for which a user is authorized (520). The database data structure may be, as examples, an index or a table. Search results may include only those results for which a user is authorized to access and omit results for which a user is not authorized to access. For example, search criteria of the search request may be modified to include a name of a user where the name of the user corresponds to authorization criteria in a column of database records to be searched, and the search may proceed by only including those records which include the name of the user. As another example, a set of results may be filtered after a search has been performed in accordance with a search request.

The data that is searched may be a result of forming associations of user information to generate authorization criteria. The forming of associations may be based on multiple layers of associations. For example, the data may include an index similar to the index 202 of FIG. 2 and be based on layers of associations similar to those in FIG. 1.

Authorization may be determined by interpreting implicit or explicit rules, authorization criteria, and environment information. For example, an implicit rule may be that any row of an index having an entry in a user column is restricted to only those users. Following that example, authorization criteria may be the information in that column, such as a list of one or more user names. And, environment information may include user information, such as a name of a user requesting a search.

A set of results are presented to a user (530). A set of results may include zero or more results (e.g., no results may be found, one result may be found, or many results may be found). Presenting a set of results may include displaying results to a user. For example, a summary of results with links to each result may be provided as a set of results. As the set of results only includes only those records for which a user is authorized, a user might not receive summaries of results for which a user is not able to retrieve full versions of the results. Presenting results to a user may include presenting results to a software program that operates with a user account.

Although the process 500 of FIG. 5 includes a certain number and type of sub-processes, implementations may vary. For example, although authorization is described as being an all or nothing type of authorization for access, different types of authorization may be authorized for access and a system may enforce access restrictions. For example, a user may be allowed to view an instance of a business object node but might not be able to modify the instance.

Figure 6:
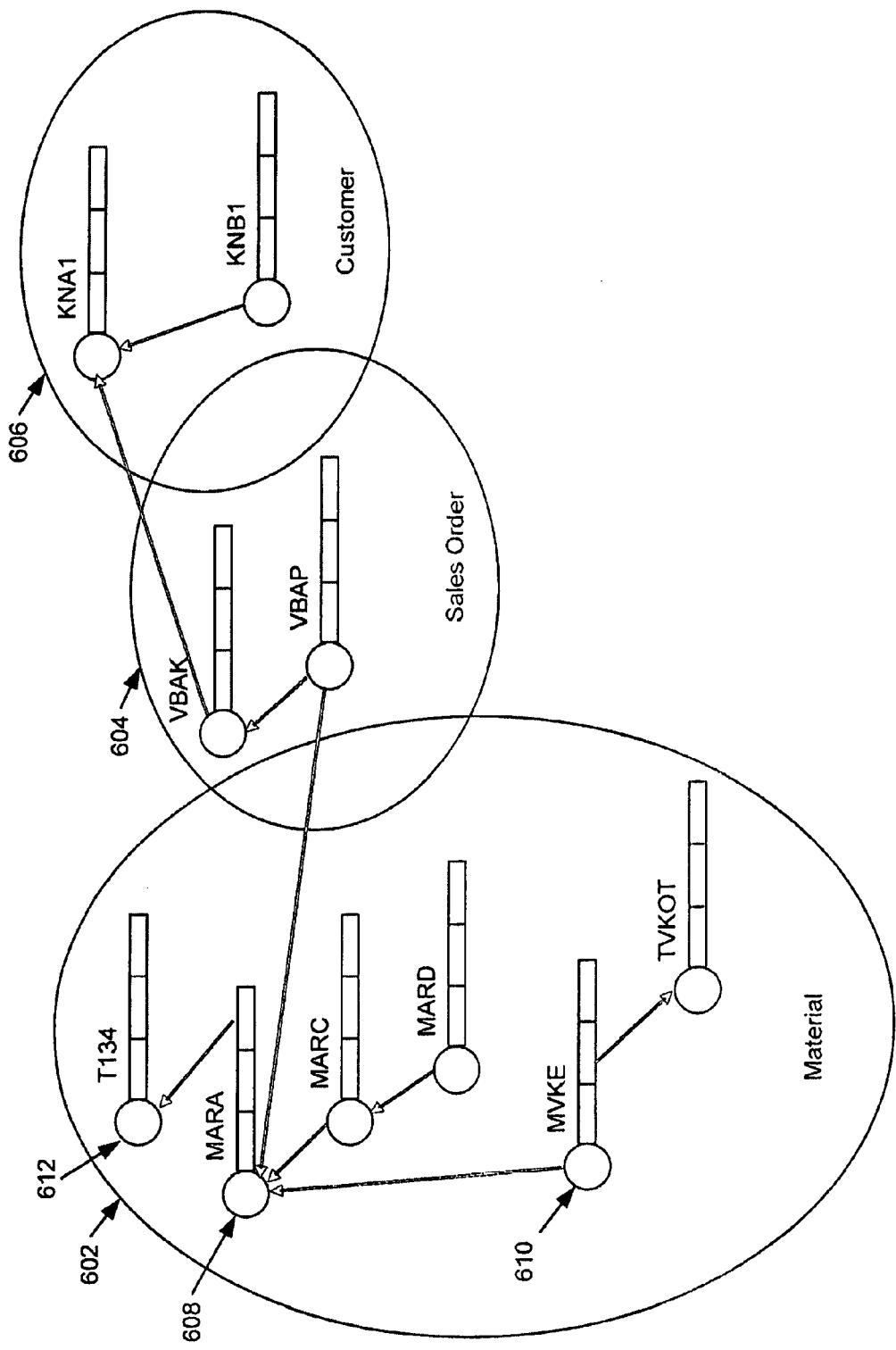
FIGS. 6-7 are block diagrams of data models of business objects including authorization information.
Figure 7:
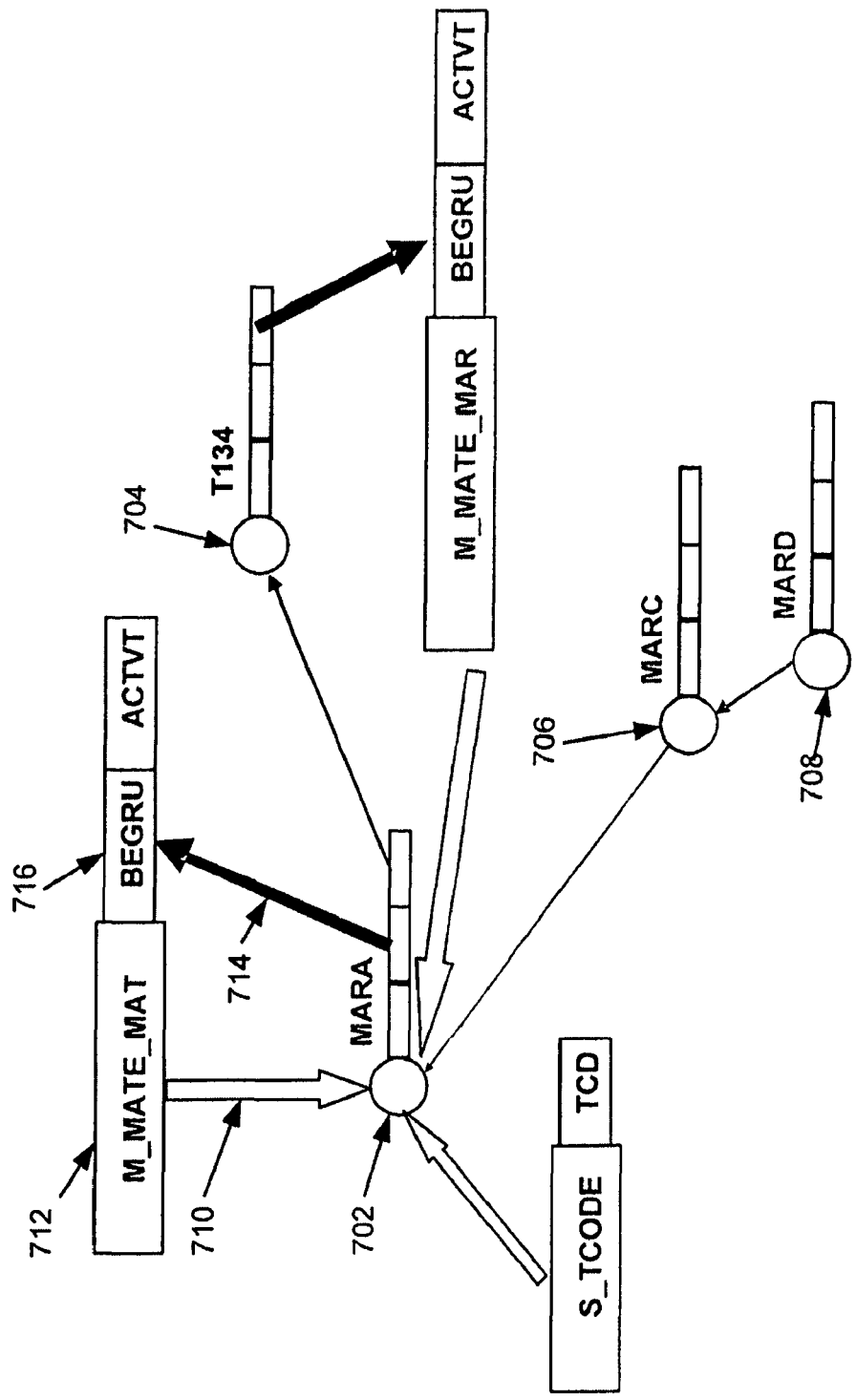

FIGS. 6-7 are block diagrams of data models of business objects including authorization information. The depictions in FIGS. 6-7 may be high-level, data model descriptions of business object data, parts of which may be implemented in the data structures of FIG. 8.

In FIG. 6, there are three business objects, including a material business object 602, sales order business object 604, and customer business object 606. Each of the business objects includes nodes, where a node is represented by a circle, which is followed by a series of rectangles that represent attributes of a node. For example, the node 608 MARA is represented by a circle. For each business object, there is only one root node. For example, the node 608 MARA of the material business object 602 is a root node. Nodes may have relationships to other nodes, where one node is a child and another is a parent, in that context. For example, the node 608 MARA is a parent node from which the node 610 MVKE depends. The node 612 T134 may be a lookup table for an attribute of MARA.

Relationships between nodes may be used to determine how to propagate authorization checks. For example, an authorization check associated with a root node may be propagated to all nodes of a business object. Similarly, an authorization check associated with one business object may be propagated to business objects that are children of that business object. For example, a request to access data in a node of a first business object that depends on a second business object may be screened in accordance with an authorization check associated with a root node of the second business object. Similarly, if a request for a search includes a join across indexes or tables, a failure of an authorization check for all records in one of the indexes may result in a failure to access data in any of the indexes.

In FIG. 7, authorization checks are added to nodes. Nodes of FIG. 7 may correspond to nodes of the material business object 602 of FIG. 6. FIG. 7 includes the nodes MARA, T134, MARC, and MARD (702, 704, 706, 708). FIG. 7 is a simplified example of a logical description of an authorization-secured business object of type material.

Authorization checks are represented in FIG. 7 by a large rectangle containing the name of the authorization check followed by several smaller rectangles that represent attributes of the authorization check, and an assignment of the authorization check to a node (white-filled arrow) and an assignment of authorization check attributes to node attributes (solid arrow). For example, one authorization check M_MATE_MAT for the MARA node 702 is represented by a large rectangle 712 containing the name of the authorization check M_MATE_MAT, the arrow 710 between the MARA node 702 and the authorization check name M_MATE_MAT 712. To represent attributes that are checked, a solid arrow is between attributes of an authorization check and attributes of a node. For example, the solid arrow 714 between attributes of the MARA node 702 and an authorization group (BEGRU) attribute 716 of the M_MATE_MAT authorization check name 712 represents that an authorization check is performed with respect to an authorization group attribute for instances of the MARA node 702.

The indexes of FIG. 1 may reflect an implementation of relationships that exist as part of authorization checks similar to those of FIG. 7. For example, the third index 106 of FIG. 1 may be implemented as an index that may be used to denote profiles for which authorization groups are allowed access to records of the first index 102 of FIG. 1. This may be similar to the authorization check indicated by the relationship between the M_MATE_MAT authorization check 712 and the MARA node 702 of FIG. 7. Thus, authorization checks for business object nodes may be implemented using additional indexes having corresponding attributes. And, relationships of authorization checks may be simplified to a single database data structure, as shown by the index 202 of FIG. 2.

Figure 8:
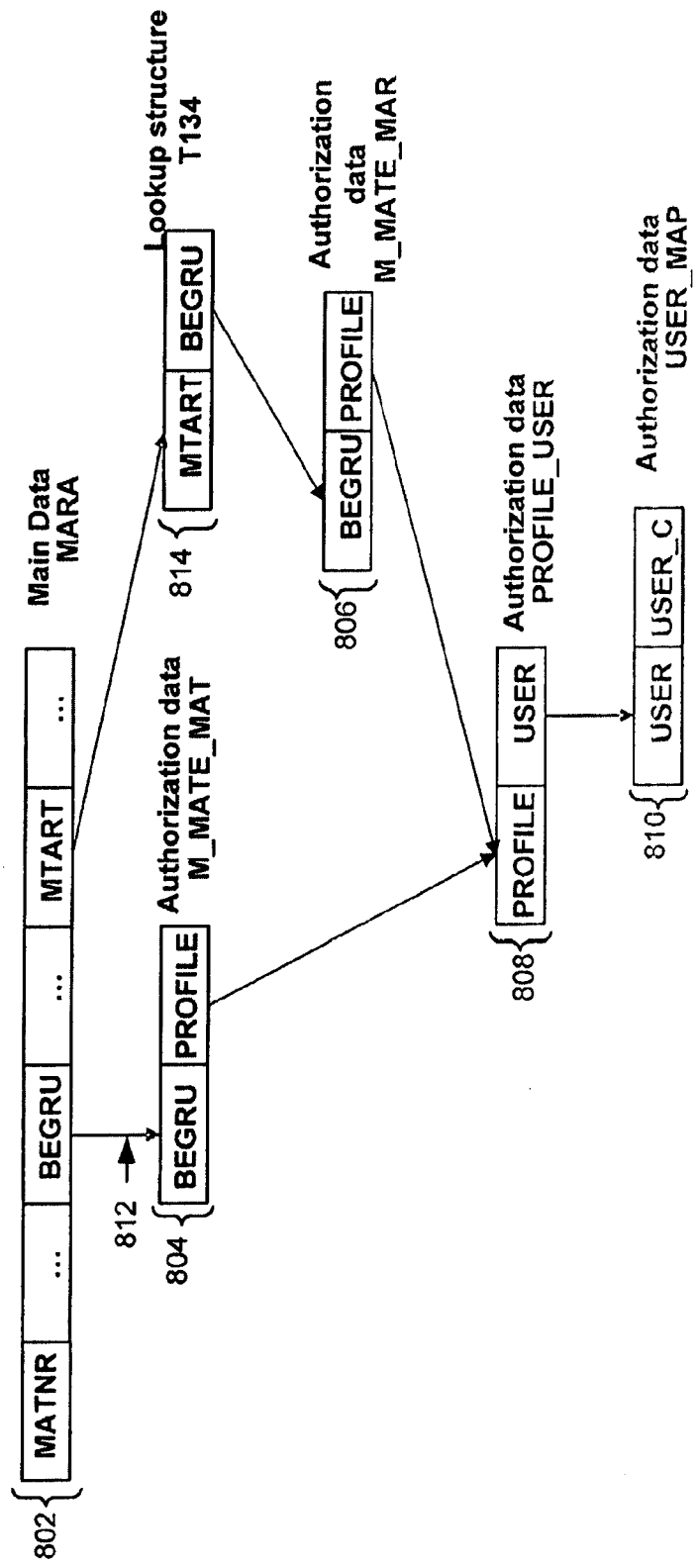
FIG. 8 is a block diagram illustrating data relationships of business object data to authorization information.

FIG. 8 is a block diagram illustrating data relationships of business object data to authorization information. In the diagram, each series of connected rectangles represents a data structure, and each rectangle represents an attribute. The data structure may be a database table, a database table index, or a search engine index, and a combination of data structures may be used (e.g., some data structures may be implemented as database indexes while others are implemented as search engine indexes). In particular, the diagram includes a structure 802 of material information referred to as MARA, structure 814 of material type data referred to as T134 (which may also be considered authorization information) and structures 804, 806, 808, 810 of authorization information. Each of the arrows in between attributes in the diagrams represents a relationship for which attribute data is related and is used to determine authorization to a record. For example, an arrow 812 between an authorization group attribute BEGRU of the structure 802 and the authorization group attribute BEGRU of the M_MATE_MAT structure 804 indicates that authorization to records in the structure 802 depends on an association between the attributes of the two structures.

The diagram of FIG. 8 may reflect some of the relationships among the data structures of FIG. 1. For example, each of FIGS. 1, 8 includes multiple levels of associations between user information and records. For example, in FIG. 8, there are multiple levels of associations between the structure 802, the M_MATE_MAT structure 804, and the PROFILE_USER structure 808. In contrast to FIG. 1, there is in additional level of associations, as the diagram of FIG. 8 includes two structures of users, the PROFILE_USER structure 808 which includes user information in accordance with users in a back-end system and the USER_MAP structure 810 which includes user information in accordance with users in a data hub, such as where a search engine may reside (e.g., a mapping of user information from a backend system where data resources may reside to a system where a search engine resides).

Although each of the figures describes a certain combination of features, implementations may vary. For example, additional, different, or fewer components may be included in the system 300 of FIG. 3.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in a computer-readable storage medium, the computer program product being operable to cause data processing apparatus to perform operations comprising:
   receiving a search request; and
   searching a database data structure populated with records based on data from a plurality of database data structures, the records comprising data and criteria for authorization to access the data,
   the searching comprising:
      generating a set of results comprising data from the database data structure for which a user is authorized and omitting data from the database data structure for which the user is not authorized, the generating comprising using the criteria to determine which results to include in the set of results; and
      presenting the set of results to the user,
   the database data structure populated with records by:
      populating a column of the criteria to be used to determine whether the user is authorized to access a record based solely on the criteria and environment information, the environment information comprising user information, the populating the column comprising accessing two or more layers of associations in a table of business object node instances and the database data structures including authorization information to find the criteria to be used to determine whether the user has access to the record;
   wherein an authorization check is used to determine if the user is authorized to access the data from the database structure responsive to the search request, the authorization check applying a set of authorization rules;
   wherein the authorization rules are applied to a specific instance of a business object node and/or to a data model of business object nodes such that the authorization rules are applied to all instances of a business object node such that the authorization rules specify at least one authorization check that is required for each corresponding instance of the business object node.

2. The product of claim 1, wherein the database data structure is generated from a join of two or more of the database data structures to include the data and the criteria in the records, the two or more of the database data structures having the data and the criteria in separate data structures.

3. The product of claim 1, wherein the database data structure is generated from the database data structures where the criteria is specific to an attribute of one of the database data structures.

4. The product of claim 3, wherein the database data structure is generated from the database data structures where the criteria is specific to an attribute of a node of a business object instance.

5. The product of claim 1, wherein the data comprises unstructured data.

6. The product of claim 1, wherein the data comprises structured data.

7. The product of claim 6, wherein the structured data comprises business objects.

8. The product of claim 1, wherein the data comprises a combination of structured and unstructured data.

9. The product of claim 1, wherein the records represent instances of nodes of business objects.

10. The product of claim 1, wherein the criteria comprises names of users, roles, profiles, or groups.

11. The product of claim 1, wherein the generating the set of results comprises modifying a query of the search request to include user information corresponding to the criteria.

12. The product of claim 1, wherein the generating the set of results comprises filtering the set of results based on user information and the criteria.

13. The product of claim 1, wherein the user information comprises a name of the user.

14. The product of claim 1, wherein the database data structure has structured data and the operations further comprise:
   performing a search of another database data structure having unstructured data in response to the search request; and
   adding results of the search of the another database data structure of unstructured data to the set of results.

15. The product of claim 1, wherein the operations further comprise storing the set of results in volatile memory.

16. The product of claim 1, wherein the presenting comprises displaying the set of results to the user.

17. A method comprising:
   receiving a search request;
   searching a database data structure populated with records based on data from a plurality of database data structures, the records comprising data and criteria for authorization to access the data, the searching comprising:
      generating a set of results comprising data from the database data structure for which a user is authorized and omitting data from the database data structure for which the user is not authorized, the generating comprising using the criteria to determine which results to include in the set of results; and
   presenting the set of results to the user;
   the database data structure populated with records by:
      populating a column of the criteria to be used to determine whether the user is authorized to access a record based solely on the criteria and environment information, the environment information comprising user information, the populating the column comprising accessing two or more layers of associations in a table of business object node instances and the database data structures including authorization information to find the criteria to be used to determine whether the user has access to the record;
   wherein an authorization check is used to determine if the user is authorized to access the data from the database structure responsive to the search request;

wherein an authorization check associated with a root node of a business object is propagated to all nodes of the business object such that the authorization check associated with the root node is required for each of the nodes of the business object.

18. A computer program product, tangibly embodied in a computer-readable medium, the computer program product being operable to cause data processing apparatus to perform operations comprising:

populating a database data structure with records based on data from a plurality of database data structures, the records comprising data and criteria for authorization to access the data, the populating comprising populating a column of the criteria to be used to determine whether a user is authorized to access a record based solely on the criteria and environment information, the environment information comprising user information, the populating the column comprising accessing two or more layers of associations in database data structures of business object node instances and the database data structures including authorization information to find the criteria to be used to determine whether the user has access to the record;

receiving a search request;

searching the database data structure, the searching comprising generating a set of results comprising data from the index for which a user is authorized and omitting data from the database data structure for which the user is not authorized, the generating comprising using the criteria to determine which results to include in the set of results; and presenting the set of results to the user;

wherein an authorization check is used to determine if the user is authorized to access the data from the database structure responsive to the search request;

wherein an authorization check associated with a first business object is propagated to all business objects that are children of the first business object such that the authorization check associated with the first business object is required for each of the first business object and the children of the business object.

19. A computer program product as in claim 18, wherein the records in the index each represent a node of the business object and the columns are key attributes that represent attributes the node of the corresponding business object.

20. A computer program product as in claim 18, wherein a rule with the index defines that two checks must be satisfied to grant access to records, the two checks including whether a user is of an authorization group of the corresponding node and the user has access to a material type of the node.

* * * * *